(No Model.)
O. N. WARDWELL & C. A. WHITE.
HORSE CHECKING DEVICE.
No. 446,126. Patented Feb. 10, 1891.
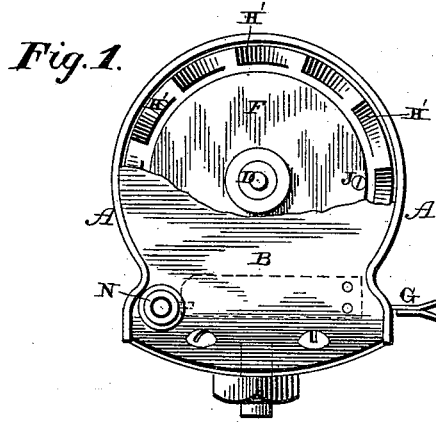
Fig. 1.
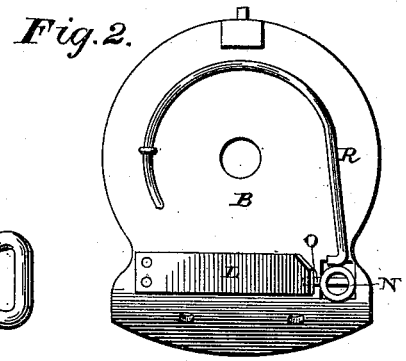
Fig. 2.
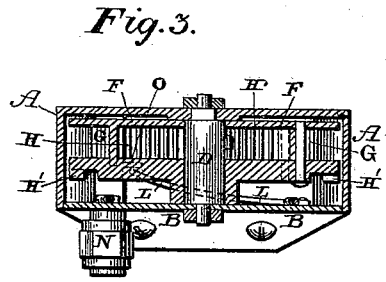
Fig. 3.
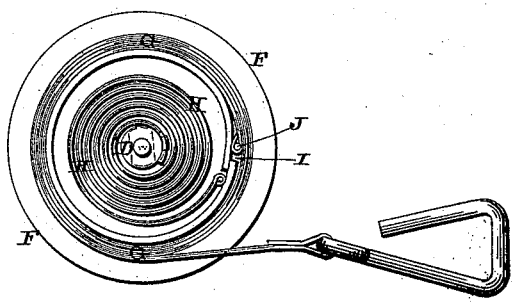
Fig. 4.
Fig. 5.
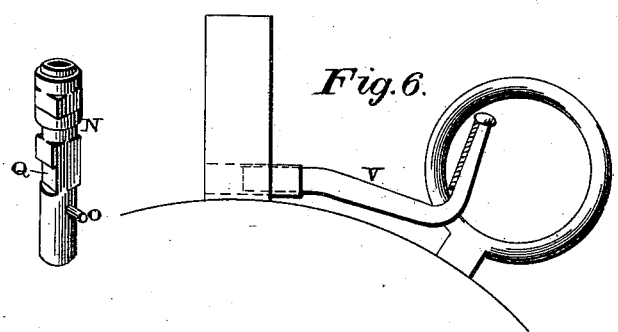
Fig. 6.
Witnesses:
E. P. Ellis,
J. M. Nesbit.
Inventors:
O. N. Wardwell,
C. A. White,
per Chas. E. Allen, atty.
THE NORRIS PETERS CO., PHOTO-LITHO., WASHINGTON, D. C.

United States Patent Office.

OLIN N. WARDWELL AND CASSIUS A. WHITE, OF JAMAICA, VERMONT.

HORSE-CHECKING DEVICE.

SPECIFICATION forming part of Letters Patent No. 446,126, dated February 10, 1891.

Application filed August 19, 1890. Serial No. 362,428. (No model.)

*To all whom it may concern:*

Be it known that we, OLIN N. WARDWELL and CASSIUS A. WHITE, citizens of the United States of America, residing at Jamaica, in the county of Windham and State of Vermont, have invented certain new and useful Improvements in Check-Hooks for Harness, of which the following is a specification, reference being had therein to the accompanying drawings.

Our invention relates to an improvement in check-hooks for harness; and it consists in the combination and arrangement of parts, which will be fully described hereinafter.

The object of our invention is to provide an attachment to which the checkrein of the harness is to be fastened, and which attachment is operated by one of the driving-reins, so as to allow the horse to freely lower his head to drink and then automatically recheck him without the necessity of the driver having to dismount from the vehicle.

Figure 1 is a side elevation of a device which embodies our invention partly in section. Fig. 2 is a view of the cap or cover taken from its inner side. Fig. 3 is a horizontal section. Fig. 4 is a detached view of the drum. Fig. 5 is a detail view of the endwise-moving rod or lever which operates the click. Fig. 6 is a view showing the relative position of the invention to one of the rings of the harness saddle.

A represents a suitable inclosing case or frame, which is preferably made of the shape here shown, and which is to be secured to the saddle of the harness by means of a bolt or any other suitable fastening. This case or frame is provided with a removable cover or end piece B, through which one end of the central rod or shaft freely passes to receive a nut upon its end. The other end of the casing is made as a part thereof and is provided with an elongated opening, through which the opposite end of the rod or shaft similarly shaped extends, and which opening is so shaped for the purpose of preventing the rod or shaft from revolving.

The central rod or shaft D, which serves both as the pivot upon which the drum F turns and to regulate the tension which shall be applied to the strap G, which is fastened to the periphery, extends horizontally through the casing A and the end piece B and receives a nut upon each of its ends for the purpose of holding the parts securely together. Inside of this drum F is placed a coiled spring H, one end of which is secured to the drum and the other to the rod or shaft D, and which serves to return the strap into place around the cylinder after it has once been drawn outward. As above stated, one end of the rod or shaft D is flattened, and this flattened end extends through the slot or elongated opening made in the stationary end of the cover or casing.

In order to regulate the tension that is to be applied to the strap G, the spring inside of the drum can be wrapped around the rod or shaft until any desired amount of tension is applied to the drum, and then the spring is prevented from uncoiling by having the flattened end of the rod or shaft made to catch in the slot or opening in the stationary head of the casing. By thus applying a tension to the drum F the strap G fastened thereto can be drawn out more or less easily, as may be desired.

The drum is provided with suitable flanges upon its periphery and between which the strap is wound, and in the outer surface of the edge of the drum is formed a recess I, in which the end of the strap, which is bent upon itself so as to form a loop, is made to catch. A rod or screw J is passed through the flanges on the drum and the loop formed upon the end of the strap, and thus the strap is secured to the drum without producing any enlargement at this point and which would interfere with the strap being wound evenly upon the periphery of the drum.

Upon one side of the drum F is formed a ratchet H', with which the spring L, secured to the inner side of the end piece B, engages for the purpose of preventing the drum F from revolving and allowing the metallic strap to be withdrawn therefrom. This spring L by having its free end engage with the ratchets H locks the drum rigidly in position inside of the casing A and prevents the drum from revolving.

Projecting through the end piece B down near its lower corner is an endwise-moving rod or lever N, which is provided with a projection O upon one side, and which has a recess Q formed in its lower edge. To the outer end of the rod N is fastened the lever V, which is to be operated by one of the driving-reins, and which lever can be made to move the rod N endwise for the purpose of drawing the free end of the spring L out of contact with the ratchets H upon the drum. This spring L by catching against a projection O upon the rod N serves to return the rod to position after having been moved outward for the purpose of operating the spring. The recess Q in the under side of the rod N serves to catch over the edge of the cover or end piece B, and thus hold the rod outward and the spring L out of contact with the ratchet, leaving the drum perfectly free to be revolved when the horse lowers his head and exerts a pull thereon through the checkrein, which has its rear end fastened to the hook upon the end of the strap. When this rod is tripped or freed by the lever which is operated by the pressure of one of the reins, the spring serves both to force the rod inward again and to again engage with the ratchet. For the purpose of causing the rod N to move in a straight line and to prevent it from becoming displaced its inner end is made to play back and forth over a guide which is formed inside of the casing.

Applied to the inner side of the removable cover or end piece B is a wire spring R, of any suitable shape, which bears down upon the top of the rod N for the purpose of depressing it, so that the recess Q in its under side will be forced down over the edge of the end piece, and thus prevent the spring L from moving the rod N inwardly until the rod or lever is tripped by the rein, when the spring L returns it to position. As soon as the rod N is drawn outward sufficiently far to withdraw the end of the spring L from contact with the ratchets of the drum, the horse can freely lower its head to any desired extent; but as soon as he raises it the spring inside of the drum causes the strap G to tighten the checkrein, and then by operating the rod N by the driving-rein the strap is locked in place upon the drum. This construction enables the driver to uncheck his horse at any time and for any purpose without the necessity of having to get out of the vehicle, as is the case with most of the checkreins now in use.

The spring R may be used, if so desired, but it is not absolutely necessary.

Having thus described our invention, we claim—

1. In a check-hook, the combination of the inclosing case, the spring-actuated drum journaled therein and having ratchet-teeth, a spring which engages the said ratchet, the check-strap which is secured to and passes around the drum, an endwise-moving rod which passes through the said case and having a projection on its inner end which engages the spring, and a recess outside of the projection which engages the casing, the rod adapted to be operated by one of the reins, for the purpose set forth.

2. In a check-hook, the combination, with the inclosing case, of the spring-actuated drum journaled within the casing and having a ratchet, flanges upon its edges, and a recess or depression in its periphery between the flanges, a strap having a loop formed upon its inner end which is placed in the depression, and a pin which passes through the drum and the loop, a spring which engages the ratchet-drum, and means for operating the spring, combined substantially as shown and described.

In testimony whereof we affix our signatures in presence of two witnesses.

OLIN N. WARDWELL.
CASSIUS A. WHITE.

Witnesses:
JOHN C. ROBINSON,
JOHN Q. SHUMWAY.